May 17, 1927.
M. KATZMAN
ELECTRIC VAPORIZER
Filed May 25, 1926
1,628,784
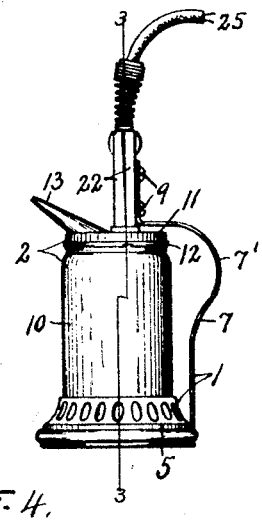
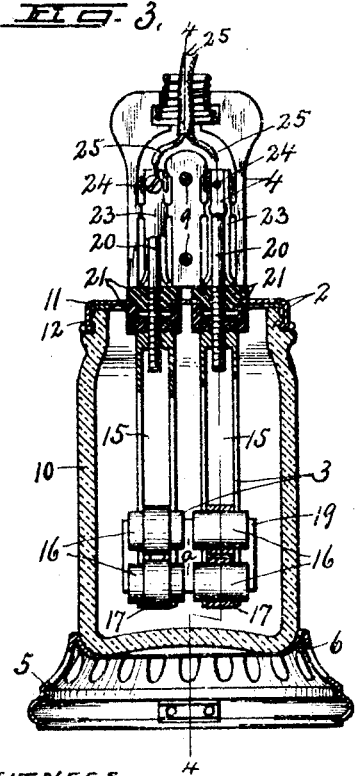
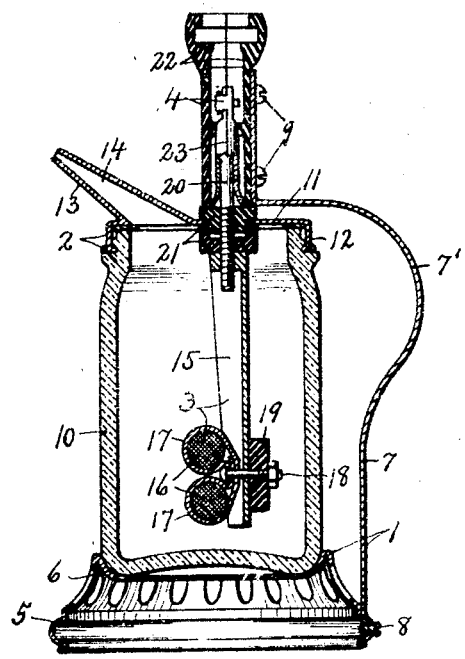
INVENTOR.
M. Katzman
BY
Denison & Thompson
ATTORNEY.
WITNESS Patented May 17, 1927.

1,628,784

UNITED STATES PATENT OFFICE.

MAX KATZMAN, OF OGDENSBURG, NEW YORK.

ELECTRIC VAPORIZER.

Application filed May 25, 1926. Serial No. 111,534.

This invention relates to an electric vaporizer, the main object of which is to provide a simple, easily portable, and thoroughly hygienic device of the character described in which various liquids may be vaporized by an electric heater therein and the vapor discharged through a restricted nozzle so that it may be expelled in jet form in any direction some distance from the container under its own expansive force for medicinal, sterilizing, odorizing or deodorizing purposes.

Another object is to construct the heater in such manner that when the liquid is vaporized to such an extent as to fall below the level of the electrodes of the heater, it will automatically break the electric circuit thereby removing the danger of overheating in case the heating circuit should remain closed when contact of the liquid with the electrodes ceases.

Another object is to construct the device in such manner that the container for the liquid may be removed from its supporting frame and when so removed will automatically break the heating circuit to prevent injury to the user by contact with the electrodes in the container.

Another object is to provide the container with a removable cover in which the restricted nozzle is formed and upon which the electric heater is mounted so that when removed the container, cover and heater may be thoroughly cleansed or the heating elements adjusted without displacement from the cover.

Other objects and uses relating to specific parts of the device will be brought out in the following description.

In the drawings:—
Figure 1 is a perspective view of an electric vaporizer in which the liquid retainer is shown as partially removed from its supporting frame thereby disconnecting the switch contacts for breaking the heater circuit.

Figure 2 is an enlarged side elevation of the same device with the parts assembled ready for use.

Figure 3 is a further enlarged vertical sectional view taken on line 3—3, Figure 2.

Figure 4 is an enlarged vertical sectional view of the same device taken at right angles to that shown in Figure 3 in the plane of line 4—4, Figure 3.
As illustrated, this device comprises a main supporting frame —1—, a container —2— and an electric heater —3— together with a suitable coupler —4— for electrically connecting and disconnecting the electrodes in and from the heater circuit.

The frame —1— comprises a base section —5— of sheet metal or equivalent material having a shallow cup shaped top portion —6— for receiving and supporting the lower end of the container —2— against lateral displacement when adjusted for use by permitting said container to be readily removed from the frame when desired in a manner hereinafter described.

An upright spring arm —7— forming a part of the main frame —1— is secured at its lower end by screws —8— to the periphery of the base —5— at one side of and preferably in spaced relation to the container —2—, said spring arm —7— having its upper end secured by screws —9— to one side of the coupler —4— for yieldingly supporting said coupler relatively to the base —5—.

The intermediate portion of the spring arm —7— is bowed outwardly at —7'— to increase its resiliency and permit the upper end of the spring with the coupler —4— thereon to move toward and from the base in the act of connecting and disconnecting the electrodes of the heater in and from the heating circuit, said bowed portion —7'— also serving as a handle by which the entire device may be supported and manipulated.

The container —2— for the liquid to be vaporized preferably comprises a transparent jar —10— of glass or equivalent material and a cover —11— which is preferably made of sheet metal.

The upper end of the jar or bottle —10— is threaded externally for receiving a threaded flange —12— on the cover —3— which may, therefore, be clamped upon and released from the jar by reverse turning movement.

The cover —11— is provided at one side of its axis with a laterally and upwardly extending nozzle —13— having a restricted passage —14— through which the liquid vapor is expelled by its own expansive force in the form of a jet some distance from the receptacle depending upon the degree of vaporization thus permitting the vapor jet to be projected in any direction by simply manipulating the device so as to point the nozzle in the direction desired.

The heater —3— preferably comprises a pair of upright electric conductor bars

—15— supported in a manner presently described upon the cover or cap —11— so as to project into the jar —10— to a lower level near, but slightly above, the bottom of the jar when the parts of the device are assembled for use.

Each bar is provided with one or more, in this instance two, cylindrical electrodes —16— of carbon secured thereto transversely thereof, one above the other, by means of a clamping plate —17— and a clamping bolt —18—.

The upright bars —15— are provided with lengthwise channels in their sides facing the electrodes and each channel is adapted to receive a portion of the clamping plate —17— which is preferably made of sheet metal or other conducting material of about the same width as the channels into which they are adapted to project for holding the clamping plate and electrodes against lateral turning movement relatively to the supporting bars —15—.

The clamping plate —17— for each pair of electrodes is looped around said electrodes so that its opposite ends overlap each other between the electrodes, said overlapping ends and central portion of the plate being provided with apertures for receiving the clamping bolt —18— whereby both electrodes may be simultaneously clamped to the corresponding supporting bar —15— in electrical contact therewith by a single bolt as —18—.

The electrodes —16— of each bar —15— are arranged in co-axial opposed relation to the electrodes of the other bar with their adjacent ends slightly spaced to form intervening relatively narrow gaps —a— through which the liquid is adapted to pass when the jar is wholly or partially filled above the level of the electrodes.

When the electric heater is energized with the liquid, the electrical resistance of the liquid in the gaps —a— causes said liquid to become heated and vaporized so that the vapor may freely collect in the upper portion of the jar and pass outwardly under its own expansive force through the restricted nozzle —13— in the form of a jet.

This heating and vaporizing of the liquid may continue as long as the level of the liquid is above the electrodes and as long as the electrodes continue to be energized but if the level of the liquid should fall below the level of the electrodes by reason of the continued evaporation, the space between the co-axial electrodes would be occupied by air which acts as an insulator and serves to automatically break the circuit through the opposed electrodes, thereby reducing to a minimum the liability of overheating and rendering the device entirely safe in the hands of the most careless user.

The bars —15— are held in parallel spaced relation by means of a cross bar —19— of insulating material connecting the lower ends of the bars —15— and held in place by the clamping bolts —18—, Figure 4.

The upper ends of the conducting bars —15— are secured by terminal screws —20— to the undersides of separate insulators —21—, each of which is preferably made of lower and upper sections adapted to engage respectively the lower and upper faces of the cap or cover section —11—, Figure 3, for insulating the terminal screws —20— from each other and from the cover.

The upper insulating sections —21— are preferably provided with reduced lower ends extending through registering openings in the cover —11— and sockets in the upper ends of the lower insulating sections.

The upper ends of the conducting bars —15— are provided with threaded apertures for receiving the lower ends of the terminal screws —20— which also engage the upper insulating sections and serve to draw the upper ends of the bars —15— tightly against the lower faces of their respective insulators —21—, said screws being extended some distance above the insulators —21— for electrical connection with companion contact members in the coupler —4—.

This coupler preferably consists of a hollow insulator block —22— within which is secured by any suitable fastening means a pair of upright contact members —23— insulated from each other by the block —22— and provided with sockets extending upwardly from their lower ends for receiving the upper ends of the terminal screws —20—, the walls of the sockets in the contact members —23— being more or less yielding to afford positive electrical contact with their respective terminals —20— when the various elements of the device are adjusted for use.

The upper ends of the contact members —23— are provided with suitable binding posts —24— to which are secured wires —25— forming parts of the heater circuit and preferably extended in cable form through the upper open end of the insulator block —22—.

The terminal screws —20— and contact members —23— constitute cooperative contacts of an electric switch by which the heater circuit may be controlled as, for example, by withdrawing the container with the terminals —20— thereon from the support and from the contact members —23— in the manner shown in Figure 1 for breaking the heater circuit at any time it may be desired.

*Operation.*

When the parts of the device are assembled in the manner shown in Figures 2, 3 and 4 and the liquid to be evaporated is placed in the container —2— above the level of the electrodes —16— and the wires —25— are connected to a source of electric supply, the heat developed by the resistance of the liquid in the gaps —a'— will cause said liquid to become heated and vaporized, the vapor being expelled under its own expansive force through the restricted passage —14— in the nozzle —13—.

This vaporization will continue during the heating of the electrodes and as long as the level of the liquid remains above the level of the electrodes but in case the level of the liquid should fall below the level of the electrodes the heating circuit will be broken by the air gap between the electrodes thereby rendering the device safe in the hands of inexperienced or careless users.

On the other hand, assuming that it is desired to cleanse the various parts of the apparatus the container —2— may be lifted by hand against the action of the spring —7— sufficiently to allow its lower end to be withdrawn from the base —5— whereupon the container with the terminals —20— thereon may be drawn downwardly for disconnecting said terminals from the contact members —23— thereby breaking the heater circuit as shown in Figure 1.

After the container has been withdrawn in the manner just described the cap —11— with the terminals —20—, bars —15— and electrode —16— thereon may be removed from the jar to permit the cleansing of the interior as well as the exterior of said jar without interference from other parts of the device.

Under these conditions, the cover —11— and bars —15—, together with the electrodes —16— and terminals —20— may also be thoroughly cleansed or the electrodes may be adjusted in their respective plates —17— or replaced by new electrodes when desired by simply loosening the bolts —18—.

It will be evident from the foregoing description that a vaporizer constructed as shown and described is particularly simple, highly efficient in projecting the vapor in any direction and is entirely safe in the hands of the user against dangers from overheating or from accidental contact with any of the electrically energized elements but it is also evident that various changes may be made in the detailed construction of the various parts of the device without departing from the spirit of this invention.

What I claim is:—

1. In an electric vaporizer, a container for the liquid to be vaporized having a restricted outlet, a supporting base for the container, a spring arm secured to and rising from the base and having its upper end overhanging the container to hold the latter on the base, an electric heater within the container, and cooperative contacts of the heater circuit mounted on the container and spring arm respectively.

2. In an electric vaporizer, a supporting base for a container, a container for the liquid to be vaporized removably supported on the base and provided with a vapor outlet, an electric heater supported within the container and provided with terminals of the heater circuit, a spring arm mounted on the base to overhang the top of the container, a coupler mounted on the upper end of the spring arm and provided with contact members of the heater circuit contacting with the first-named contact members for closing the circuit when the container is on the base.

3. In an electric vaporizer, a container for the liquid to be vaporized having a removable cover provided with a vapor-discharge nozzle projecting upwardly and laterally from the top wall thereof, an electric heater secured to the top wall of the cover to project into the container when the cover is closed and removable with said cover, said heater being provided with contact terminals forming a part of the heater circuit, and a coupler movable toward and from said cover and provided with contact terminals of the heater circuit movable into and out of contact with the terminals of the heater as the coupler is moved toward and from the cover.

In witness whereof I have hereunto set my hand this 17th day of May 1926.

MAX KATZMAN.